United States Patent [19]

Anderka et al.

[11] 4,173,020

[45] Oct. 30, 1979

[54] AUTOMATIC DRAFTING INSTRUMENT WITH STYLOGRAPHIC PEN

[75] Inventors: Gerald Anderka, Ellerbek; Klaus Straszewski, Quickborn; Walter Jozat, Bad Bramstedt: Eduard Schütt, Norderstedt; Wolfgang Puritz, Buxtehude-Oevelgönne, all of Fed. Rep. of Germany

[73] Assignees: Rotring-Werke Riepe KG; Aristo-Werke Dennert & Pape KG, both of Hamburg, Fed. Rep. of Germany, part interest to each

[21] Appl. No.: 922,626

[22] Filed: Jul. 7, 1978

[30] Foreign Application Priority Data

Nov. 15, 1977 [DE] Fed. Rep. of Germany ....... 2750937

[51] Int. Cl.[2] ............................................ G01D 15/16

[52] U.S. Cl. ................................ 346/140 R; 346/141

[58] Field of Search .......................... 346/140 R, 141; 33/18 R

[56] References Cited

U.S. PATENT DOCUMENTS

| | | | |
|---|---|---|---|
| 2,963,337 | 12/1960 | Spalek. | |
| 3,340,541 | 9/1967 | Klassen et al. | 346/141 |
| 3,346,869 | 10/1976 | Stone. | |
| 3,613,248 | 10/1971 | McInnis | 33/18 R |
| 4,081,804 | 3/1978 | Breemen et al. | 346/140 R |
| 4,097,874 | 6/1978 | Anderka et al. | 346/141 |
| 4,106,031 | 8/1978 | Jozat | 346/141 |

FOREIGN PATENT DOCUMENTS 1356301 6/1964 France .

*Primary Examiner*—Monroe H. Hayes
*Attorney, Agent, or Firm*—David H. Semmes

[57] ABSTRACT

An automatic drafting instrument of the type supporting a plurality of stylographic pens above a drafting surface. The instrument includes a reciprocating mechanism for lowering the pens from an upper rest position to a lower drafting position in contact with the drafting surface. The device is characterized by a vertically actuable and pivotable sealing element which engages the writing pen tip in its rest position and is actuable vertically downwardly and pivotably away from the pen as it is lowered to the writing surface.

10 Claims, 4 Drawing Figures

AUTOMATIC DRAFTING INSTRUMENT WITH STYLOGRAPHIC PEN

BACKGROUND OF THE INVENTION

(1) Field of the Invention

Stylographic drafting pens, particularly "automatic" drafting instruments wherein a plurality of stylographic pens are reciprocably mounted within a housing above the writing surface. The instrument includes a reciprocating mechanism for lowering the pens from an upper rest position out of contact with a drafting surface to a lower position in contact with the drafting surface. Particularly, a resilient sealing means engagable with the individual writing pen tips in the upper rest position and pivotable away from the pen tips, as they are lowered into contact with a drafting surface. In conventional devices, the pivoting of the sealing element into and out of contact with the writing pen tip has been damaging to the pen tip and destructive of the sealing element.

SUMMARY OF THE INVENTION

According to the present invention a plurality of stylographic drafting pens are reciprocably supported in a housing for reciprocation from an upper rest position where the writing tip is out of contact with a drafting surface to a lower drafting position where the writing tip is in contact with a drafting surface. A companion sealing element for each stylographic pen is reciprocably and pivotably supported in the housing adjacent each pen, so as to be movable from a sealing position in engagement with the writing pen tip in its upper rest position to a nonsealing position of disengagement with the pen tip, as the writing tip is lowered towards a drafting surface. A resilient linkage is supported in the housing and interposed between the individual stylographic pens and sealing elements, such that reciprocating and pivoting of the sealing element effects a sequential and corresponding lowering of the writing tip from its upper rest position to its lower drafting position in engagement with the writing surface. A blocking device is provided, so as to prevent lowering of the individual pens, until the corresponding sealing element has been reciprocated and pivoted out of its path.

In accordance with an earlier proposal for an automatic drawing instrument entitled "Blocking Assembly For An Automatic Drafting Device" (Ser. No. 793,447, filed May 3, 1977, now U.S. Pat. No. 4,097,874), the sealing element is laterally pivotable away from sealing engagement with the writing tip. As the sealing element is pivoted laterally, the tubular pen may be lowered from its rest position and into contact with a drawing surface. Correspondingly, and as drafting is completed, the tubular pen is lifted into the rest position and, subsequently, the sealing element is again laterally pivoted onto the writing tip, so that a sealing of the tubular pen is effected.

In the case of this earlier drawing instrument, an effective sealing of the tubular pen is thus achieved in its rest position and the sealing element does not interfere with lowering of the tubular pen from its rest position. However, difficulties can arise due to the fact that the sealing element is laterally pivoted with respect to the writing tip. In general, a certain deformation of the sealing element is effected in its sealing position due to the fact that the front end or tip of the writing tube is impressed into the sealing element. This engagement between writing tip and sealing element can lead to tearing-up or pulling apart of the sealing element upon lateral pivoting of the sealing element and, particularly, in the case of small diameter writing tips for drafting small width lines, the writing tips may be damaged.

It is, therefore, an object of this invention to create an automatic drawing instrument with which the sealing element can be moved into and out of its sealing position without possible damage to the writing tip or sealing element.

In order to achieve this object, an automatic drawing instrument is provided with a sealing element which can be moved vertically downwardly from the writing tip and subsequently pivoted laterally away from the tip, as the pen is lowered towards a writing surface.

Thus, the sealing element is moved from its sealing position into its laterally pivoted position in two sectional movements, i.e. a first vertical movement by means of which the sealing element and writing tube are separated from each other without the possibility of damage and a second lateral movement by means of which the sealing element is pivoted laterally away from the area of lowering the tubular pen. In this manner, damage is avoided both with respect to the sealing element and the writing tip in rest position and with respect to the pen tip during lowering of the tip for writing.

DESCRIPTION OF THE PREFERRED EMBODIMENTS

Figure 2:
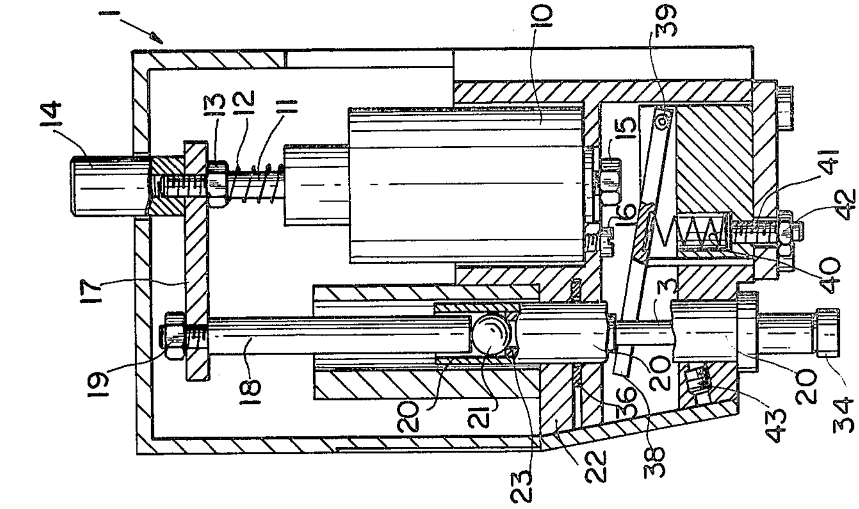
FIG. 2 is a vertical section, taken along the line II—II of FIG. 1.
Figure 1:
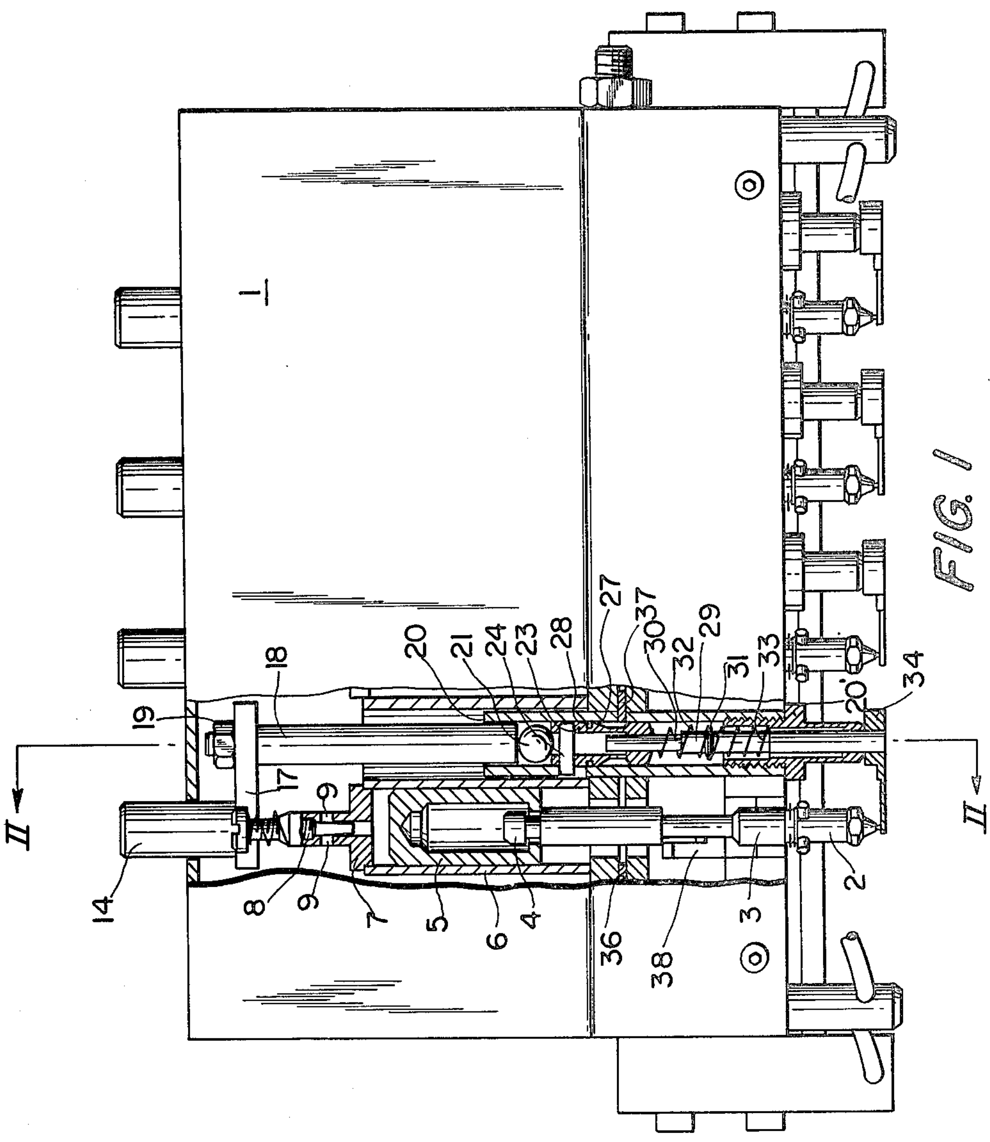
FIG. 1 is a fragmentary side elevation, in section, showing a drawing head containing four tubular stylographic pens within an automatic drafting instrument and according to the invention.

An automatic drafting instrument or drawing head 1 shown in FIGS. 1 and 2 contains four tubular pens, which may be lowered for drafting. Each pen has its respective sealing element and conduit for the supply of writing fluid or ink. Such a drawing head and especially the supply and regulation of the writing fluid are, for example, described in West German Patent Application No. P 27 41 311.1, filed Sept. 14, 1977.

Only tubular pen 2 of the array of tubular pens is detailed with respect to its vertical support and respective sealing element and reciprocating structure. The remaining tubular pens and sealing elements are designed, similarly.

As can be seen in FIG. 1, tubular pen 2 may be connected to fastening axle 3 by means of a threaded arrangement, with axle 3 extending upwardly into the casing of drawing head 1 and having a reduced diameter in its central area, so that an annular shoulder is formed for engagement with blocking lever 38, as set forth below. The upper end of fastening axle 3 extends into piston 5 and the connection is maintained by means of securing element 4. Piston 5 reciprocates with a suction stroke within a cylinder 6. Cylinder 6 includes a top closure 7 which has, on the one hand a horizontal borehole 9 and, on the other hand, a vertical receiving duct for regulating element 8. Regulating element 8 may be threaded downwardly into closure 7 against spring pressure or regulating element 8 may threaded upwardly with respect to closure 7, so that the truncated cone-shaped end of regulating element 8 more or less seals off the horizontal borehole 9 with respect to the opening of the vertical receiving duct which extends in an axial direction towards the inner chamber of cylinder 6. In this manner, there is achieved a delayed pressure equalization between ambient air and the inner chamber of the cylinder 6 through the horizontal borehole 9 and the vertical receiving duct, as the tubular pen 2 is released from rest position and lowered into drawing position. Thus, when piston 5 slides downwardly within cylinder 6 at the desired slow speed, the writing tip of pen 2 is correspondingly placed slowly on the drawing surface, so as to avoid bouncing movements and ink spot formation.

Figure 3:
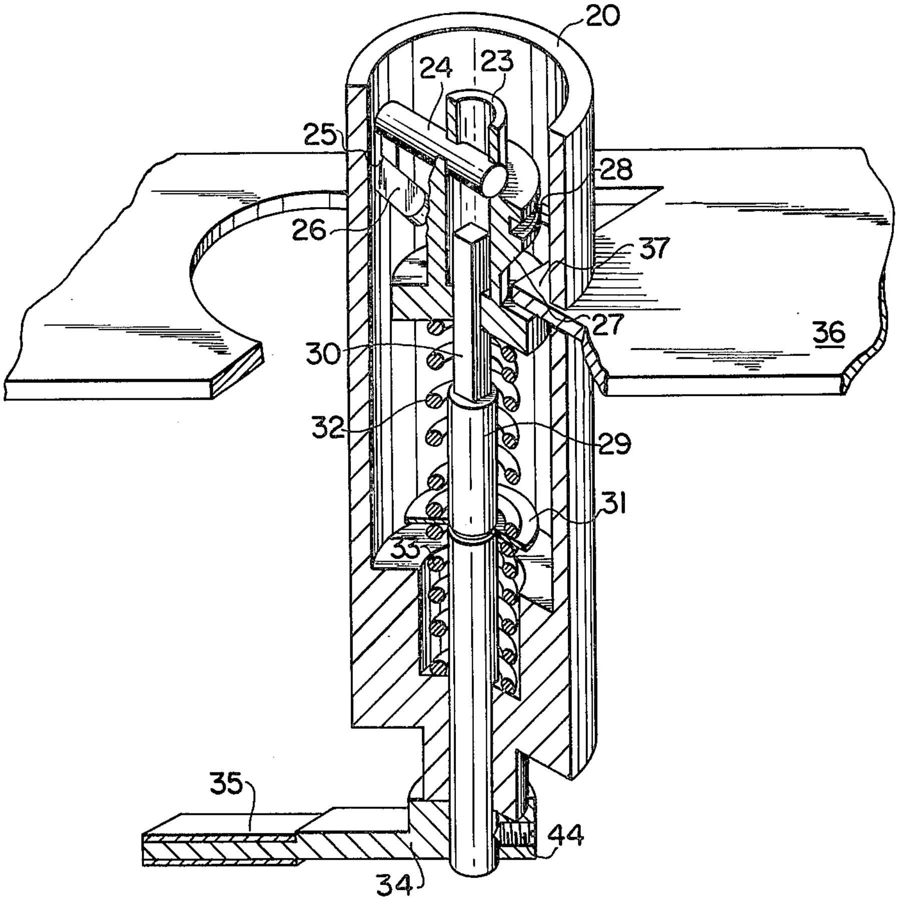
FIG. 3 is an enlarged, fragmentary perspective, partially in section, showing the arrangement for lowering, as well as locking of the sealing element in the lowered position.
Figure 4:
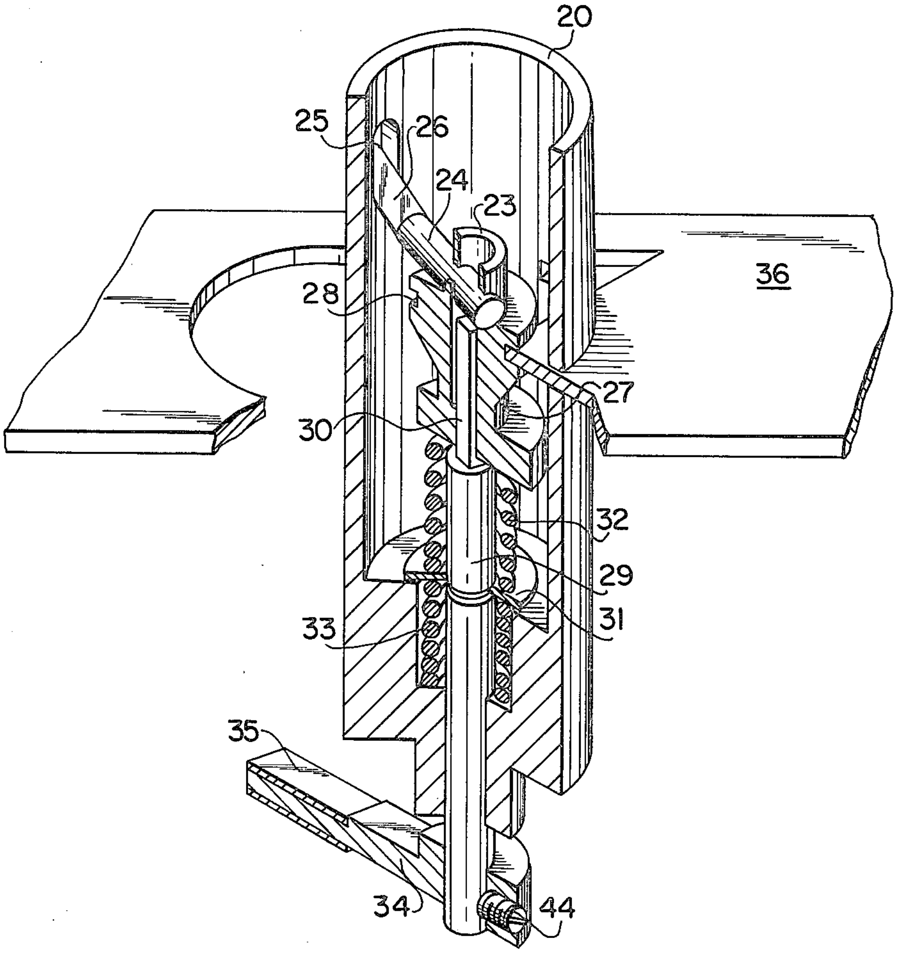
FIG. 4 is an enlarged, fragmentary perspective, partially in section, as in FIG. 3, showing the sealing element in its laterally swung and locked position.

As illustrated, in FIGS. 3 and 4 lowering of tubular pen 2 can only be effected when sealing element 35 pivots or swings laterally away from the writing tube, as blocking lever 38 (illustrated in FIGS. 1 and 2) is pivoted downwardly about axis 3.

This arrangement, as is illustrated particularly in FIG. 1, serves the purpose of both lowering and pivoting of sealing element 35.

As shown, in FIGS. 3 and 4, sealing element 35 is fastened upon a sealing lever 34 which, in its turn is secured to the lower end of supporting axle 29 by means of set screw 44 or the like. Supporting axle 29 extends coaxially within stationary sleeve 20 and is secured within the casing of drawing head 1 by means of a set screw 43, as illustrated in FIG. 2. Sleeve 20 is illustrated as a single cylinder in FIGS. 3 and 4, but may consist of two separate cylinders 20 and 20' threaded into each other, so as to simplify production and as illustrated in FIG. 1.

Supporting axle 29 has a square upper section 30 at its inner end upon which sleeve-like supporting element 27 is mounted for movement coaxially. Guide pin 24 extends laterally through tubular support 23, such that its outer end 25 pivots within guide groove defined in the wall of stationary sleeve 20. Guide pin inner section 26 does not engage the groove 26. This limited movement of guide pin 24 and outer end 25 results in a correspondingly limited vertical movability of tubular support 23.

Disc 31 forming a supporting surface is secured to the middle area of supporting axle 29 and a helical compression spring 33 surrounds supporting axle 29 in such a manner that its upper end abuts the lower surface of disc 31 and the lower end of the spring abuts an inner annular shoulder of stationary sleeve 20. The modulus of compression of spring 33 is chosen, such that supporting axle 29, in its sealing position, shown in FIGS. 1 and 3, is pushed upwardly in such a way that the sealing element 35 reaches its desired sealing engagement with the writing tip of tubular pen 2.

Upper compression spring 32 is co-axially mounted upon supporting axle 29, such that its lower end abuts the upper side of disc 31 and its upper end abuts the lower surface of supporting element 27.

As illustrated in FIGS. 1 and 2, ball 21 is placed upon the upper end of tubular support 23, such that the upper surface of ball 21 contacts driving pin 18. A threaded area is provided at the upper free end of driving pin 18 to which a crossbar 17 is secured by means of nut 19. Crossbar 17 at its other end is connected to pestle 11 of lifting magnet or solenoid 10 by means of supporting nut 13 and adjusting cap 14. Nut 13 and cap 14 permit an adjustment of position of crossbar 17 and compression spring 12 urges the pestle 11 upwardly when magnet 10 is deenergized.

Solenoid 10 is secured upon stationary crossarm 22 in the writing head casing by means of set screw 16. Crossarm 22 has also a pestle extension aligned with pestle 11. This pestle section is formed by screw 15 which is adjustable in an axial direction. Below this pestle extension there is pivoted blocking lever 38, which can be pivoted reciprocably about axis 39 from the upper position shown in FIG. 2, in which it rests against an annular upper shoulder of fastening axle 3 for the tubular pen 2 and thus locks the tubular pen in its upper or resting position, against the pressure of compression spring 40. As illustrated in FIG. 2, spring 40 is adjustable by means of threaded bolt 41 and nut 42.

When tubular pen 2 is to be lowered into its lower or drawing position and away from the rest position shown in FIGS. 1 and 2, solenoid 10 is energized such that pestle 11 and pestle extension 15 move, downwardly against the pressure of compression spring 12. The downward movement of pestle 11 results in a corresponding downward movement of driving pin 18, whereby tubular support 23 is moved axially downwardly. This downward movement effects a corresponding movement of guide pin 24 and 25 within the groove and in parallel to the longitudinal axis of the tubular support 23, as well as a downward movement of supporting axle 29 and, thus, of sealing element 35. During this downward movement of axle 29, spring 32 is not compressed due to its higher rigidity; instead a compression of spring 33 is effected.

It should be pointed out that tubular pen 2 does not start its lowering movement simultaneously with the downward movement of sealing element 35. Initially blocking lever 38 is still maintained in the position illustrated in FIG. 2, because pestle extension 15 does not yet engage blocking lever 38 during the first stage of the reciprocating movement of solenoid 10.

The compression of spring 33 is not achieved until the disc 31 rests against the lower, annular shoulder formed in stationary sleeve 20 or its separable part 20', as illustrated in FIG. 1. Compression of spring 33 is preferably achieved at the latest when guide pin 24 outer end 25 abuts the edge of the guide groove. However, compression of spring 33 can be adjusted for completion when, for example, guide pin 24 outer end 25 is still moving within the guide groove, so that during the continued downward movement of guide pin 24, initially only the compression of spring 32 is effected without sealing element 35 being moved still further downwardly.

When guide pin 24 has reached its lower position such that end 25 abuts the lower limit of the guide groove and disc 31 is resting upon the corresponding stationary annular shoulder, vertical lowering movement of sealing element 35 is completed. With a continuing downward movement of driving pin 18 and, thus, of tubular support 23, a shifting of tubular support 23 is now effected in an axial direction in relation to the square section 30 of supporting axle 29. Thus, spring 32 is compressed but supporting axle 29 cannot be moved further, axially downwardly, due to the fact that disc 31 rests against the stationary annular shoulder. During this downward movement of the tubular support 23, guide pin 24 outer end 25 is moved within the groove in a corresponding downward movement, so that then tubular support 23, in relation to the stationary sleeve 20, not only makes an axial downward movement, but also a rotating movement or lateral pivot, with respect to driving pin 18. This rotating movement of tubular support 23 results, through square section 30, in a rotating movement of supporting axle 29 and, thus, a corresponding lateral pivot of the sealing element. Thus pivot is completed when guide pin 24 has reached the lower end of part 26 within the guide groove, so that sealing element 35 is then in its laterally pivoted position, as illustrated in FIG. 4.

When lowering tubular pen 2 into the drawing position, fastening axle 3 must be released by blocking lever 38. This release is effected at any point in time after a first part of the reciprocating movement of solenoid 10, i.e. when pestle extension 15 engages blocking lever 38 and pivots lever 38 about axis 29, against the pressure of compression spring 40, and in a downward direction. The commencement of this pivoting movement can be preselected by a corresponding setting of set screw 15, forming the pestle extension.

When blocking lever 38 is freed from the annular shoulder of fastening axle 3, it begins a downward pivoting movement which, as described above, is slowed by the sliding of piston 5 within cylinder 6. As pointed out above, this slowing or decelerating effect 3, i.e. the speed of pressure equalization within the end of the cylinder 6 away from the fastening axle 3, can be adjusted by means of regulating element 8. In this manner, the writing tip of tubular pen 2 is placed smoothly upon the drawing base.

When drawing with tubular pen 2, it may happen that the writing tip is momentarily lifted off the drawing surface and shortly thereafter replaced upon the drawing surface in order to draw, for example, dotted or dash-and-dot lines. This lifting is essentially effected by de-energizing solenoid 10, so that pestle 11 and pestle extension 15 are lifted due to the effect of compression spring 12. Blocking lever 38 is pushed upwardly by compression spring 40, so that blocking lever 38 correspondingly lifts tubular pen 2. With the corresponding energization of solenoid 10, so as to overcome the effect of compression spring 12, a pivoting downwardly of blocking lever 38 is then again effected in the above described manner and with a lowering of the tubular pen onto the drawing base.

During these short-term lifting processes, it is not expedient to simultaneously swing or pivot sealing element 35 into engagement with the writing tip, since this would lead to a delay in the drawing process. For this reason, a stopping device may be provided, as essentially described in the latest West German Patent Application No. P 27 07 258.8 now U.S. Pat. No. 4,097,874, entitled BLOCKING ASSEMBLY FOR AN AUTOMATIC DRAFTING DEVICE. This stopping device contains a slide 36, supported in a plane transverse to the longitudinal axis of tubular pen 2 and to the longitudinal axis of the supporting axle 29, which is actuable vertically against the compression of springs 32 and 33. Slide 36 has a locking projection for each of the sealing elements 35 and, as is particularly shown in FIG. 3, the respective locking projection 37 extends through a slot in stationary sleeve 20 and into a groove-like receiving area in tubular support 23. The upper wall of the receiving area is formed by a wedge surface 27 running diagonally towards the outside and top. Upon lowering of tubular support 23, stopping projection 37 slides along the wedge surface 27, owing to the downward movement of the driving pin 18, so that slide 36 is urged towards the right against spring pressure, as illustrated in FIGS. 3 and 4. At the end of the lowering movement of tubular support 23, the stopping projection 37 engages annular stopping groove 28 which is provided above the receiving area in tubular support 23, so that tubular support 23 cannot move further in an axial direction even with de-energizing of solenoid 10. Thus, sealing element 35 is maintained in its pivoted position. This which permits short-term lifting and subsequent lowering of the tubular pen onto the drawing base without sealing element 35 being moved, so that interruptions in the course of lines during the drawing process can be effected readily.

Unlocking of sealing element 35 can be effected manually by moving slide 36 towards the right, as illustrated in FIGS. 3 and 4 while solenoid 10 is de-energizing and, thus, tubular pen 2 is lifted upwardly. Springs 32 and 33 then move tubular support 23 axially upwardly, so that guide pin 24 and 25 moves upwardly, within the guide groove and, in this way, sealing element 35 is raised for engagement with the top of the writing tube, whereby spring 33 urges sealing lever 34 against the lower end of sleeve 20 and the writing tip is in contact with the sealing element 35 due to the force of gravity, as illustrated in FIG. 1.

It goes without saying that, also, a timing circuit may be employed for release of the locking projection 27 which produces a corresponding releasing movement of the slide 36 when tubular pen 2 has been lowered for a given period of time. In such case, it may be assumed that the lifting of tubular pen 2 had not been effected in order to produce an interruption in a drawn line.

We claim:

1. An automatic drafting instrument of the type embodying a stylographic pen, having a capillary writing tip, comprising:

A. A housing;

B. A stylographic drafting pen having a capillary writing tip and being reciprocably supported in said housing for reciprocation from an upper rest position where the writing tip is out of contact with the drafting surface to a lower drafting position where the writing tip is in contact with a drafting surface;

C. A sealing element reciprocably and pivotably supported in said housing adjacent said pen, so as to be movable from a sealing position in engagement with said writing tip in its upper rest position to a non-sealing position of disengagement with said pen tip, as said writing tip is lowered towards a drafting surface; and D. A resilient linkage interposed between said pen and said sealing element, such that reciprocating and pivoting of said sealing element results in a corresponding lowering of said writing tip from its upper rest position to its lower drafting position in engagement with a writing surface.

2. An automatic drafting instrument as in claim 1, wherein at least one compression spring is supported in said housing in engagement with said linkage, so as to urge said pen to its upper rest position.

3. An automatic drafting instrument as in claim 2, including a solenoid mechanism supported in said housing and in an engagement with said compression spring to overcome said spring in reciprocating said drafting pen and sealing element to said drafting position.

4. An automatic drafting instrument as in claim 3, including a cylinder and an extension of said writing pen reciprocably supported in said cylinder, said cylinder having means for adjusting the rate of reciprocation and, thus, the rate of lowering of said writing tip into contact with a drafting surface.

5. An automatic drafting instrument as in claim 4, said sealing element being supported upon a vertical axis in contact with said linkage, such that a lowering of said pen results in an initial lowering of said sealing element away from the writing tip and a sequential pivoting laterally of said sealing element with respect to the axis of said writing tip.

6. An automatic drafting instrument as in claim 5, wherein a plurality of stylographic drafting pens are mounted in parallel, within said housing each pen with its own sealing element and resilient linkage.

7. An automatic drafting instrument as in claim 6, said sealing element having a vertical extension reciprocable within a vertically extending sleeve supported in said housing and said extension being in contact with said linkage, and said sealing element including a laterally extending pin extending through an aperture in said sleeve, such that downward reciprocation of said sealing element and said pin extending through said aperture effects a lateral pivoting of said sleeve about its vertical axis.

8. An automatic drafting instrument as in claim 7, including sealing lock means reciprocably mounted in said housing upon a horizontal axis, so as to engage said sealing means and thereby lock said sealing means against reciprocation.

9. An automatic drafting instrument as in claim 8, said sealing lock means extending through an aperture in said sleeve and engaging said vertical extension, so as to lock said extension and said sealing means against reciprocation.

10. An automatic drafting instrument as in claim 9, further including a blocking lever pivoted at one end in said housing in contact with said solenoid, and engaging said extension of said writing pen, so as to prevent lowering of said extension and said writing pen, except upon pivoting actuation of said solenoid.

* * * * *